United States Patent
Kyoung (10) Patent No.: US 7,382,518 B2
(45) Date of Patent: Jun. 3, 2008

(54) OPTICAL MODULATOR

(75) Inventor: Je-Hong Kyoung, Seongnam-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 71 days.

(21) Appl. No.: 11/591,095

(22) Filed: Oct. 31, 2006

(65) Prior Publication Data

US 2007/0177245 A1   Aug. 2, 2007

(30) Foreign Application Priority Data

Nov. 1, 2005   (KR) ...................... 10-2005-0104020
Oct. 2, 2006   (KR) ...................... 10-2006-0097434

(51) Int. Cl.
*G02B 26/00*   (2006.01)

(52) U.S. Cl. ...................................... 359/291; 359/290

(58) Field of Classification Search ............... 359/197, 359/212, 237, 247, 254, 290, 291, 302, 572, 359/578, 847, 849

See application file for complete search history.

(56) References Cited

U.S. PATENT DOCUMENTS

2004/0150871 A1 *   8/2004   Yang ........................... 359/291

\* cited by examiner

*Primary Examiner*—William C Choi
(74) *Attorney, Agent, or Firm*—Christensen O'Connor Johnson Kindness PLLC (57) ABSTRACT

An optical modulator having a protective film on a reflective layer is disclosed. One aspect of the invention provides an optical modulator having a protective film on a reflective layer, including a substrate; an insulation layer positioned on the substrate; a ribbon layer which has its center portion spaced apart from the insulation layer by a predetermined distance; an upper reflective layer, positioned on the center portion of the ribbon layer, which reflects or diffracts incident light; an upper-reflective-layer protective film, positioned on the upper reflective layer, which protects the upper reflective layer; and a piezoelectric element, positioned on the ribbon layer, which moves the center portion of the ribbon layer vertically. Certain embodiments of the invention prevent the deterioration and oxidation of the reflective layer surface due to heat or humidity, to maximize the light diffraction property and reliability of the optical modulator.

9 Claims, 5 Drawing Sheets

OPTICAL MODULATOR

CROSS-REFERENCE TO RELATED APPLICATIONS

This application claims the benefit of Korean Patent Application No. 2005 0104020 filed with the Korean Intellectual Property Office on Nov. 1, 2005, and of Korean Patent Application No. 2006-0097434, filed on Oct. 2, 2006, the disclosures of which are incorporated herein by reference in their entirety.

BACKGROUND

1. Technical Field

The present invention relates to a MEMS structure and a manufacturing method thereof, more particularly, to an optical modulator and a manufacturing method thereof.

2. Description of the Related Art

MEMS refers to a microelectromechanical system or element, which is a technology that uses semiconductor manufacturing technology to form three-dimensional structures on silicon substrates. There are a variety of applications in which MEMS is used, an example of which is the field of optics. Using MEMS technology allows the manufacture of optical components smaller than 1 mm, by which micro-optical systems can be implemented. Micro-optical components such as optical modulators and micro-lenses, etc., corresponding to micro-optical a system, is selected for application in telecommunication devices, displays, and recording devices, due to such advantages as quick response time, low level of loss, and convenience in layering and digitalizing.

The optical modulator is a circuit or device which loads signals on a beam of light (optical modulation) when the transmission medium is optical fiber or free space in the optical frequency range. The optical modulator can be divided mainly into a direct type, which directly controls the on/off state of light, and an indirect type, which uses reflection and diffraction, where the indirect type may further be divided into an electrostatic type and a piezoelectric type according to how it is operated.

Regardless of its operation type, the indirect type optical modulator performs optical modulation by means of interference occurring due to the differences in paths between lights reflected or diffracted on different surfaces. Thus, the optical modulator necessarily requires a reflective layer for reflecting or diffracting light, and in order to improve the light diffraction efficiency of the optical modulator, the surface properties of the reflective layer must be maximized.

However, surface deterioration of the reflective layer is increased by heat generated during the process of forming the reflective layer or during subsequent manufacture processes, and stress changes in the reflective layer dependent on changes in temperature are also greatly increased.

Further, the ambient humidity generated during the process of forming the reflective layer or during subsequent manufacture processes causes the surface of the reflective layer to be oxidized.

Such deterioration in surface properties of the reflective layer has adverse effects on the light diffraction properties of the overall optical modulator, and lowers its reliability.

SUMMARY

Thus, aspects of the invention provide an optical modulator and a manufacturing method thereof, in which the deterioration and oxidation of the reflective layer surface due to heat or humidity can be avoided.

Also, other aspects of the invention provide an optical modulator and a manufacturing method thereof, in which the light diffraction property and reliability of the overall optical modulator can be maximized, by improving the properties of the reflective layer by means of a protective layer.

These and other aspects of the invention will readily be understood by the description provided below.

One aspect of the invention provides an optical modulator having a protective film on a reflective layer, including a substrate; an insulation layer positioned on the substrate; a ribbon layer which has its center portion spaced apart from the insulation layer by a predetermined distance; an upper reflective layer, positioned on the center portion of the ribbon layer, which reflects or diffracts incident light; an upper-reflective-layer protective film, positioned on the upper reflective layer, which protects the upper reflective layer; and a piezoelectric element, positioned on the ribbon layer, which moves the center portion of the ribbon layer vertically.

An optical modulator according to an embodiment of the invention may further include a sacrificial layer which is positioned at an upper part of the insulation layer and at a lower part of the ribbon layer and which supports the ribbon layer. Here, a portion of the sacrificial layer located at a lower surface of the center portion of the ribbon layer is etched, to be spaced apart from the insulation layer by a predetermined distance.

Further, an optical modulator according to an embodiment of the invention may also further include a lower reflective layer, positioned on the insulation layer, which reflects or diffracts incident light, and a lower-reflective-layer protective film, positioned on the lower reflective layer, which protects the lower reflective layer.

Here, the material of the upper reflective layer or the material of the lower reflective layer may be any one of $Al_2O_3$, $SiO_2$, $Si_3N_4$, SiON, and SiOF.

It may be preferable that the thickness of the upper reflective layer or of the lower reflective layer be selected from $10^{-3}$ μm to 1 μm.

Also, the upper-reflective-layer protective film or the lower-reflective-layer protective film may comprise a plurality of layers, and a material of at least one of the plurality of layers may be any one of $Al_2O_3$, $SiO_2$, $Si_3N_4$, SiON, and SiOF.

Additional aspects and advantages of the present invention will be set forth in part in the description which follows, and in part will be obvious from the description, or may be learned by practice of the invention.

BRIEF DESCRIPTION OF THE DRAWINGS

FIGS. 7(*a*) through 7(*g*) are diagrams illustrating the manufacturing process for the optical modulator having a protective film on the reflective layer shown in FIG. 6.

DETAILED DESCRIPTION

The optical modulator having a protective film on a reflective layer, according to certain embodiments of the invention will be described below in more detail with reference to the accompanying drawings. Detailed descriptions will not be provided for related prior art, when it is deemed that such detailed descriptions may obscure the essence of the invention. The numerals (e.g. the first, the second, etc.) used in the descriptions of this specification are merely for differentiating identical or similar objects in an orderly manner.

Figure 1:
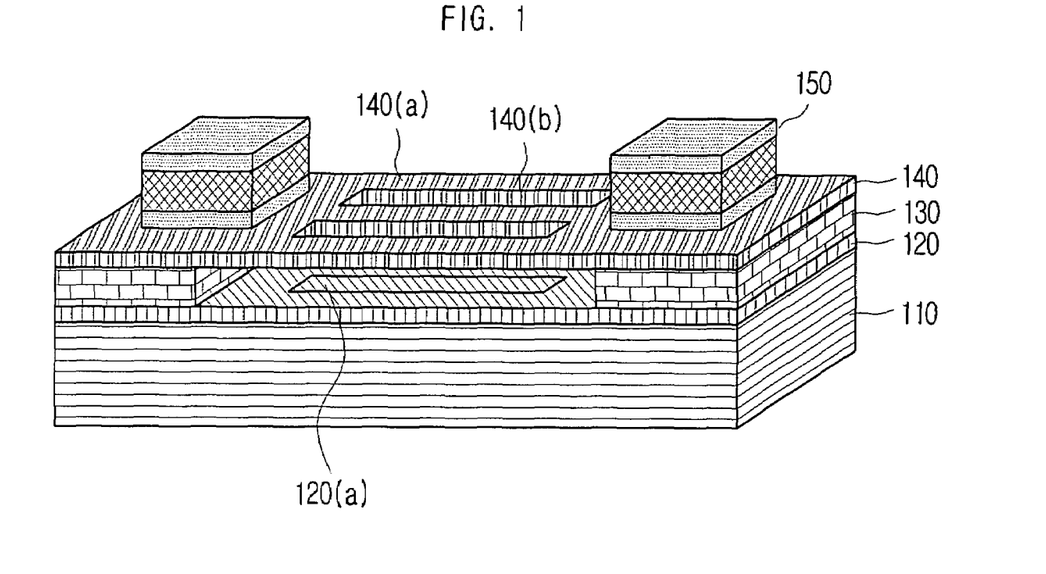
FIG. 1 is a perspective view of a piezoelectric type optical modulator applicable to an embodiment of the present invention.
Figure 2:
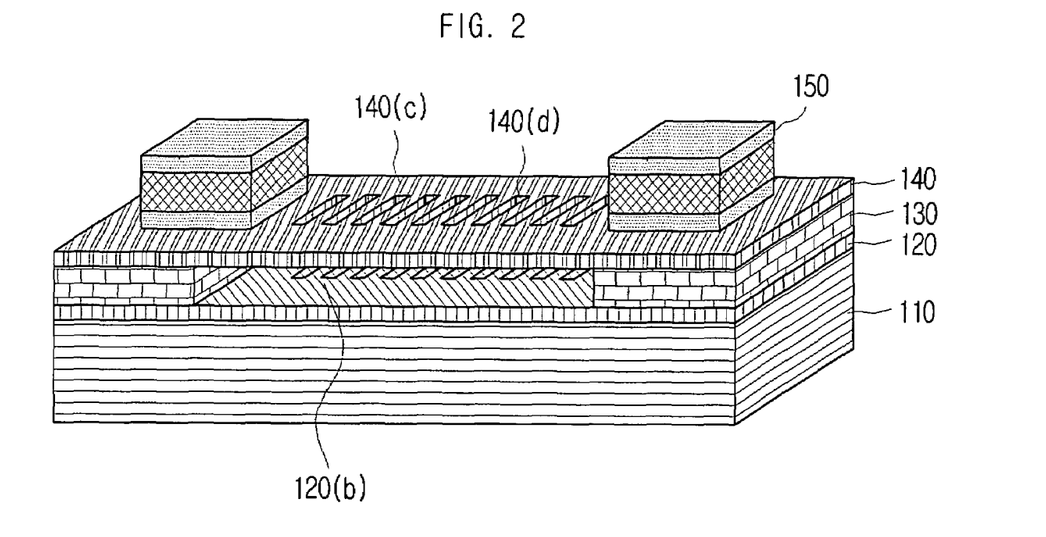
FIG. 2 is a perspective view of another piezoelectric type optical modulator applicable to an embodiment of the present invention.

The piezoelectric type optical modulator applicable to an embodiment of the invention will first be described before discussing embodiments of the present invention FIG. 1 is a perspective view of a piezoelectric type optical modulator applicable to an embodiment of the present invention, and FIG. 2 is a perspective view of another piezoelectric type optical modulator applicable to an embodiment of the present invention.

Referring to FIGS. 1 and 2, the piezoelectric type optical modulator includes a substrate 110, an insulation layer 120, a sacrificial layer 130, a ribbon layer 140, and piezoelectric elements 150. The ribbon layer 140 has a plurality of holes 140(*b*), 140(*d*) in its center portion. In addition, an upper reflective layer 140(*a*), 140(*c*) may be formed on the rest of the center portion of the ribbon layer 140 that is not occupied by the holes, and a lower reflective layer 120(*a*), 120(*b*) may be formed on the insulation layer 120 in correspondence with the plurality of holes. The piezoelectric elements 150 control the ribbon layer 140 to bend vertically, according to the degree of up/down or left/right contraction and expansion generated by the voltage difference between upper and lower electrodes.

Each part of the optical modulator will be described later in more detail with reference to FIG. 5. The following descriptions for FIGS. 3 and 4 will concentrate on the principles of optical modulation according to height changes between the ribbon layer 140 and the insulation layer 120.

Figure 3:
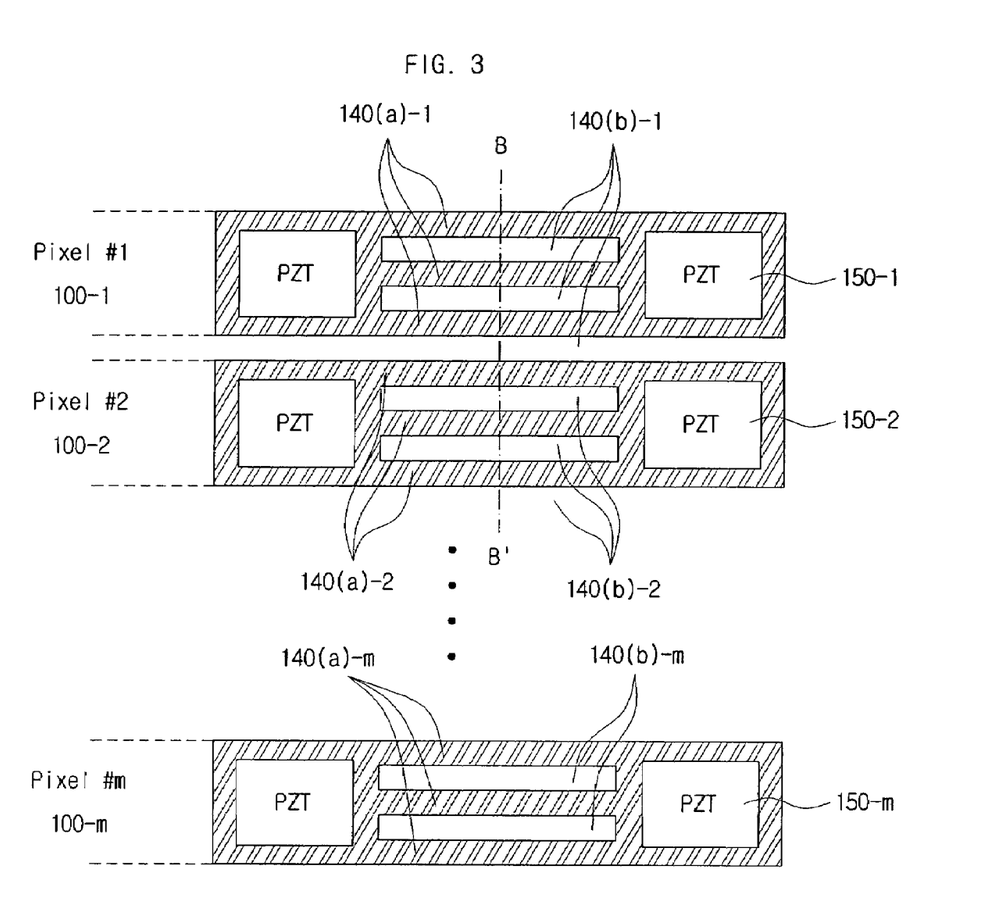
FIG. 3 is a plan view of an optical modulator array composed of optical modulators such as that shown in FIG. 1.
Figure 4:
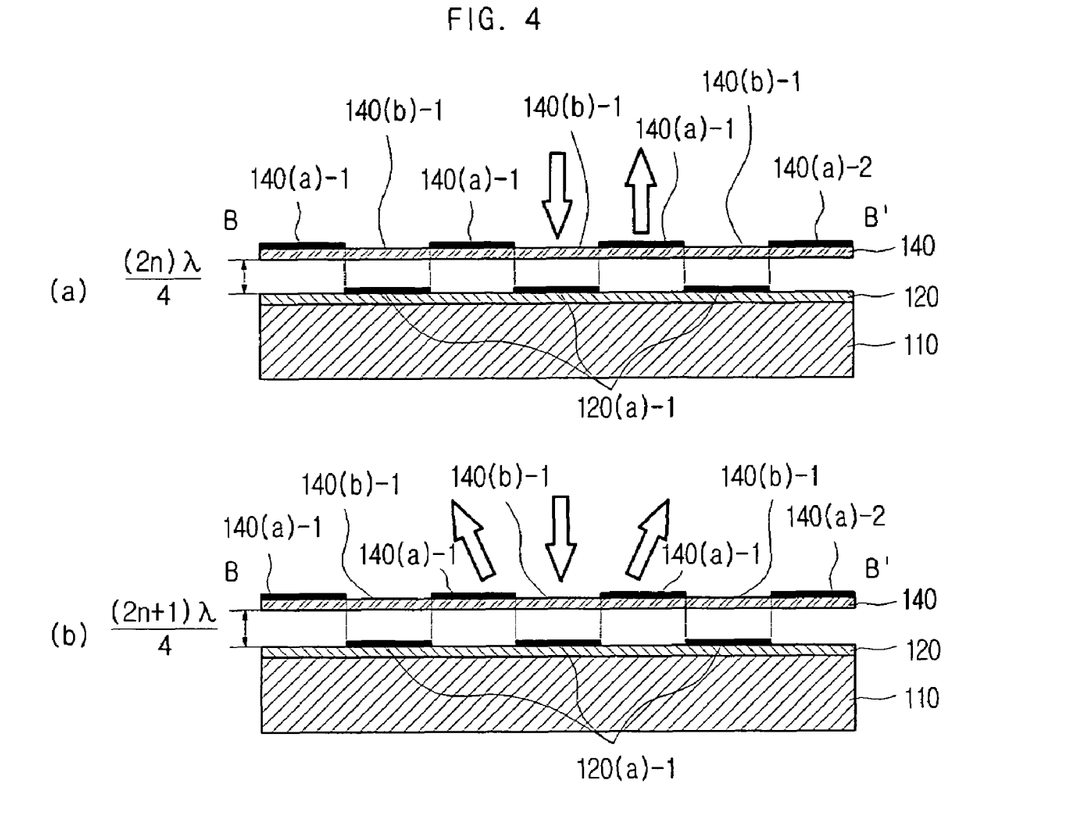
FIGS. 4(a) and 4(b) are diagrams illustrating the principles of optical modulation in the optical modulator array of FIG. 3.

FIG. 3 is a plan view of an optical modulator array composed of optical modulators such as that shown in FIG. 1, and FIG. 4 is a diagram illustrating the principles of optical modulation in the optical modulator array of FIG. 3. Here, FIG. 4 is a cross-sectional view across line B-B' of FIG. 3.

Referring to FIG. 3, the optical modulator array is composed of an m number of micromirrors 100-1, 100-2, . . . , 100-*m*, each responsible for pixel #1, pixel #2, . . . , pixel #m, respectively. The optical modulator array deals with image information with respect to one-dimensional images of vertical or horizontal scanning lines (Here, it is assumed that a vertical or horizontal scanning line consists of an m number of pixels.), while each micromirror 100-1, 100-2, . . . , 100-*m* deals with one pixel among the m pixels constituting the vertical or horizontal scanning line. Thus, the light reflected and diffracted by each micromirror is later projected by an optical scanning device as a two-dimensional image on a screen. For example, in the case of VGA 640*480 resolution, modulation is performed 640 times on one surface of an optical scanning device (not shown) for 480 vertical pixels, to generate 1 frame of display per surface of the optical scanning device. Here, a polygon mirror, a rotating bar, or a galvano mirror, etc., may be used for the optical scanning device.

While the description below of the principle of optical modulation concentrates on pixel #1, the same may obviously apply to other pixels.

In the present embodiment, it is assumed that the number of holes 140(*b*)-1 formed in the ribbon layer 140 is two. Because of the two holes 140(*b*)-1, there are three upper reflective layers 140(*a*)-1 formed on the upper portion of the ribbon layer 140. On the insulation layer 120, two lower reflective layers are formed in correspondence with the two holes 140(*b*)-1. Also, there is another lower reflective layer formed on the insulation layer 120 in correspondence with the gap between pixel #1 and pixel #2. Thus, there are an equal number of upper reflective layers 140(*a*)-1 and lower reflective layers 120(*a*)-1 per pixel, and it is possible to control the luminosity of the modulated light using 0-order diffracted light or ±1-order diffracted light.

Referring to FIG. 4, in the case where the wavelength of a beam of light is $\lambda$, a first voltage is applied to the piezoelectric elements 150 that makes the distance substantially equal to $(2n)\lambda/4$ (wherein n is a natural number) between the ribbon layer 140, on which an upper reflective layer 140(*a*) is formed, and the insulation layer 120, on which a lower reflective layer 120(*a*) is formed (see (a) of FIG. 4). Here, in the case of a 0-order diffracted (reflected) beam of light, the overall path length difference between the light reflected by the upper reflective layer 140(*a*) and the light reflected by the lower reflective layer 120(*a*) is equal to $n\lambda$, so that constructive interference occurs, and the diffracted light has its maximum luminosity. In the case of +1 or −1 order diffracted light, however, the luminosity of the light is at its minimum value due to destructive interference.

Also, a second voltage is supplied to the piezoelectric elements 150 that makes the distance substantially equal to $(2n+1)\lambda/4$ (wherein n is a natural number) between the ribbon layer 140, on which an upper reflective layer 140(*a*) is formed, and the insulation layer 120, on which a lower reflective layer 120(*a*) is formed (see (b) of FIG. 4). Here, in the case of a 0-order diffracted (reflected) beam of light, the overall path length difference between the light reflected by the upper reflective layer 140(*a*) and the light reflected by the lower reflective layer 120(*a*) is equal to $(2n+1)\lambda/2$, so that destructive interference occurs, and the diffracted light has its minimum luminosity. In the case of +1 or −1 order diffracted light, however, the luminosity of the light is at its maximum value due to constructive interference.

As a result of such interferences, the optical modulator can load signals on the beams of light by controlling the quantity of the reflected or diffracted light. While the foregoing describes the cases in which the distance is $(2n)\lambda/4$ or $(2n+1)\lambda/4$ between the ribbon layer 140, on which an upper reflective layer 140(*a*) is formed, and the insulation layer 120, on which a lower reflective layer 120(*a*) is formed, it is to be appreciated that a variety of embodiments may be applied with regards the present invention, which are operated with gaps capable of controlling the intensity of interference by diffraction and reflection.

Figure 5:
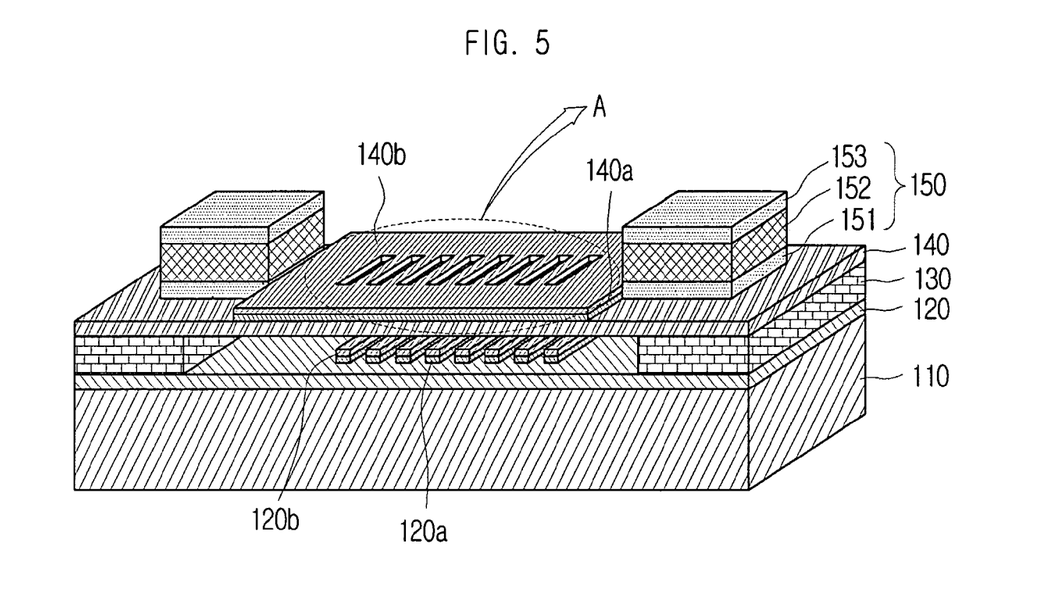
FIG. 5 is a perspective view of an optical modulator having a protective film on the reflective layer according to an embodiment of the present invention.
Figure 6:
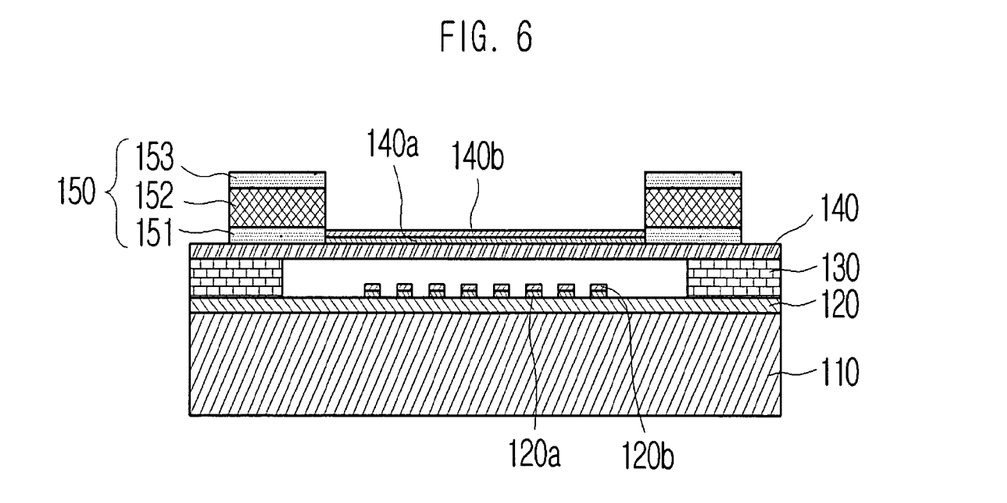
FIG. 6 is a cross-sectional view of the optical modulator having a protective film on the reflective layer shown in FIG. 5.

FIG. 5 is a perspective view of an optical modulator having a protective film on the reflective layer according to an embodiment of the present invention, and FIG. 6 is a cross-sectional view of the optical modulator shown in FIG. 5.

While the following description concentrates on an optical modulator having holes in the center portion of the ribbon layer 140, as shown in FIG. 5, it is merely for the purpose of illustration, and does not limit the scope of the invention. That is, any optical modulator that includes a piezoelectric element, which contracts and expands in correspondence to the power supplied between electrodes to provide vertical operating power on the ribbon part, for implementing light diffraction properties, may be used in an embodiment of the invention. Here, the ribbon part generally refers to the portion of the ribbon layer 140 that can be moved vertically by means of the operating power generated by the piezoelectric element 150, which in this embodiment corresponds the center portion of the ribbon layer 140.

Referring to FIGS. 5 and 6, the optical modulator according to certain embodiments of the invention includes a substrate 110, an insulation layer 120, a lower reflective layer 120a, a lower-reflective-layer protective film 120b, a sacrificial layer 130, a ribbon layer 140, an upper reflective layer 140a, an upper-reflective-layer protective film 140b, and piezoelectric elements 150.

The substrate 110 may be a typical semiconductor substrate, and may be made from a material such as silicon (Si), alumina ($Al_2O_3$), zirconia ($ZrO_2$), quartz, or silica ($SiO_2$), etc.

The insulation layer 120 is positioned on the substrate 110. The insulation layer 120 acts as an etch stop layer, and is formed from a material with a high selectivity to the etchant (where the etchant is an etchant gas or an etchant solution) which etches the material used for the sacrificial layer 130. Here, the material used for the insulation layer 120 may be silica ($SiO_2$), etc.

A reflective layer (hereinafter referred to as "lower reflective layer") 120a, capable of reflecting and diffracting light, is formed on the insulation layer 120. A protective film (hereinafter referred to as "lower-reflective-layer protective film") 120b for protecting the lower reflective layer 120a may be formed on the lower reflective layer 120a.

However, in the case of an optical modulator that is not equipped with holes, unlike the optical modulator of FIG. 5, there is no need to form the lower reflective layer 120a on the insulation layer 120. In this case, it would not be necessary to form the lower-reflective-layer protective film 120b either.

Detailed descriptions on the lower reflective layer 120a and the lower-reflective-layer protective film 120b will be provided later with the descriptions on the upper reflective layer 140a and the upper-reflective-layer protective film 140b.

The sacrificial layer 130 is positioned on the insulation layer 120, and may be made from materials such as silicon (Si) or polycrystalline silicon (poly-Si), etc.

After the sacrificial layer 130 is stacked on the insulation layer 120, all or portions of the sacrificial layer 130 may be etched by means of a process that will be described later (see (f) of FIG. 7). Such an etching process allows the center portion of the ribbon layer 140 to be spaced apart from the insulation layer 120 by a predetermined distance, thereby creating an operating space in-between. Here, the operating space refers to the empty space between the ribbon layer 140 and the insulation layer 120, and because of this operating space, the center portion of the ribbon layer 140, i.e. the ribbon part, is able to move vertically in correspondence to the operating power of the piezoelectric elements 150. The rest of the sacrificial layer 140 that is not removed by the etching process supports the ribbon layer 140.

While only portions of the sacrificial layer 130 are etched, in the optical modulator illustrated in FIG. 5, so that the sacrificial layer 130 is positioned on both ends of the insulation layer 120 to support the ribbon layer 140, it is possible to have all of the sacrificial layer 130 etched by a process that will be described later (see (g) of FIG. 7). In this case, the sacrificial layer 130 does not support the ribbon layer 140, and only provides the operating space by which the ribbon layer 140 can move vertically. In other words, the location of the operating space may vary according to the etching process of the sacrificial layer 130. Obviously, when the location of the operating space is changed, the location of the ribbon part in the ribbon layer 140 may also be changed accordingly.

The ribbon layer 140 is positioned on the sacrificial layer 130. Here, a silicon nitride material ($Si_XN_Y$), such as $Si_3N_4$, may be used for the ribbon layer 140.

The ribbon layer 140 may be selectively etched, by means of a process that will be described later (see (e) of FIG. 7), to form a particular shape (in this embodiment, a shape having one or more holes in the center portion of the ribbon layer 140).

A reflective layer (hereinafter referred to as "upper reflective layer") 140a, capable of reflecting or diffracting light, is formed on the center portion, i.e. the ribbon part, of the ribbon layer 140. Detailed descriptions on the upper reflective layer 140a and the upper-reflective-layer protective film 140b will be provided later.

The piezoelectric elements 150 are positioned on the ribbon layer 140, and generate operating power that allows the ribbon part to move vertically.

The piezoelectric elements 150 include a lower electrode 151, a piezoelectric layer 152 formed on the lower electrode 150, which contracts or expands when a predetermined voltage is supplied to generate a vertical operating power, and an upper electrode 153 formed on the piezoelectric layer 152, which supplies the predetermined voltage formed on the piezoelectric layer 152 together with the lower electrode 151.

Here, the electrode material used for the lower or upper electrode 151, 153 may be platinum (Pt), nickel (Ni), gold (Au), aluminum (Al), titanium (Ti), $RuO_2$, or $IrO_2$, etc., or a combination thereof. The lower or upper electrode 151, 153 may be formed by deposition methods such as sputtering or vacuum evaporation, etc., within the thickness range of 0.01~3 μm.

The piezoelectric layer 152 may be formed by a wet process (screenprinting, sol-gel coating, etc.) or by a dry process (sputtering, vacuum evaporation, MOCVD, vapor disposition, etc.) within the thickness range of 0.01~20.0 μm. Here, the piezoelectric layer 152 may be of a piezoelectric material such as PZT, PNN-PT, PLZT, AIN, or ZnO, etc.

Descriptions will be provided below for the upper reflective layer 140a and upper-reflective-layer protective film 140b with reference to the 'A' portion of FIG. 5, which substantially also apply to the lower reflective layer 120a and lower-reflective-layer protective film 120b.

Referring to the 'A' portion of FIG. 5, an upper-reflective-layer protective film 140b is formed on the center portion, i.e. the ribbon part, of the ribbon layer 140, for preventing the deterioration or oxidation of the upper reflective layer 140a.

While any one of a variety of reflective materials (e.g. metals—such as Pt, Cr, Ag, etc.) may be used for the upper reflective layer 140a, it may be preferable that the upper reflective layer 140a be made of aluminum (Al) or an aluminum alloy. This is because, the stress changes caused by surface deterioration and temperature changes due to heat generated during the process of forming the reflective layer or any subsequent manufacturing processes are less in aluminum or an aluminum alloy, compared to other reflective materials.

The upper-reflective-layer protective film 140b is formed on the upper reflective layer 140a and prevents the ambient humidity from reacting directly with the upper reflective layer 140a, to prevent the reflective layer from being oxidized. Also, the upper-reflective-layer protective film 140b prevents stress changes caused by surface deterioration and temperature changes due to heat generated during the process of forming the reflective layer 140a or any subsequent manufacturing processes. Thus, by preventing surface deterioration or oxidation of the upper reflective layer 140a, the upper-reflective-layer protective film 140b increases the light diffraction efficiency and reliability of the optical modulator.

Any one of alumina ($Al_2O_3$), silica ($SiO_2$), a silicon nitride material ($Si_xN_y$) such as $Si_3N_4$, etc., SiON, and SiOF may be used for the upper-reflective-layer protective film 140b. In addition, the upper-reflective-layer protective film 140b may be composed of a plurality of layers, where it is obvious that any of the materials described above may be used as a material for each of the plurality of layers.

Here, it may be preferable that the thickness of the upper-reflective-layer protective film 140b be from $10^{-3}$ μm to 1 μm. The lower limit ($10^{-3}$ μm) is set as the minimum thickness that allows the upper-reflective-layer protective film 140b to function as a protective film for preventing the deterioration or oxidation of the reflective layer, and the upper limit (1 μm) is set as the maximum thickness with which the light reflection property of the upper reflective layer 140a is unaffected.

Here, it may be preferable to continue the process of forming the upper-reflective-layer protective film 140b while maintaining a vacuum in the same chamber as for the process of forming the upper reflective layer 140a. This is to prevent the natural oxidation of the reflective surface that may occur when the reflective layer is exposed to the atmosphere outside the vacuum chamber after the process of forming the reflective layer is completed. For example, when using aluminum for the reflective layer, there is a risk that an $Al_2O_3$ film may form on the surface of the reflective layer.

Unlike the reflective-layer protective film formed artificially, this natural oxide film that may form on the surface of the reflective layer is very different in the crystalline properties of the film, such that it cannot function as a reflective-layer protective film. Moreover, the natural oxide film also acts as an obstacle to subsequent processes of manufacturing the modulator.

Thus, continuing the process of forming the reflective-layer protective film in a vacuum in the same chamber as for the process of forming the upper reflective layer may provide the advantage of preventing the forming of a natural oxide film on the surface of the reflective layer.

Figure 7:
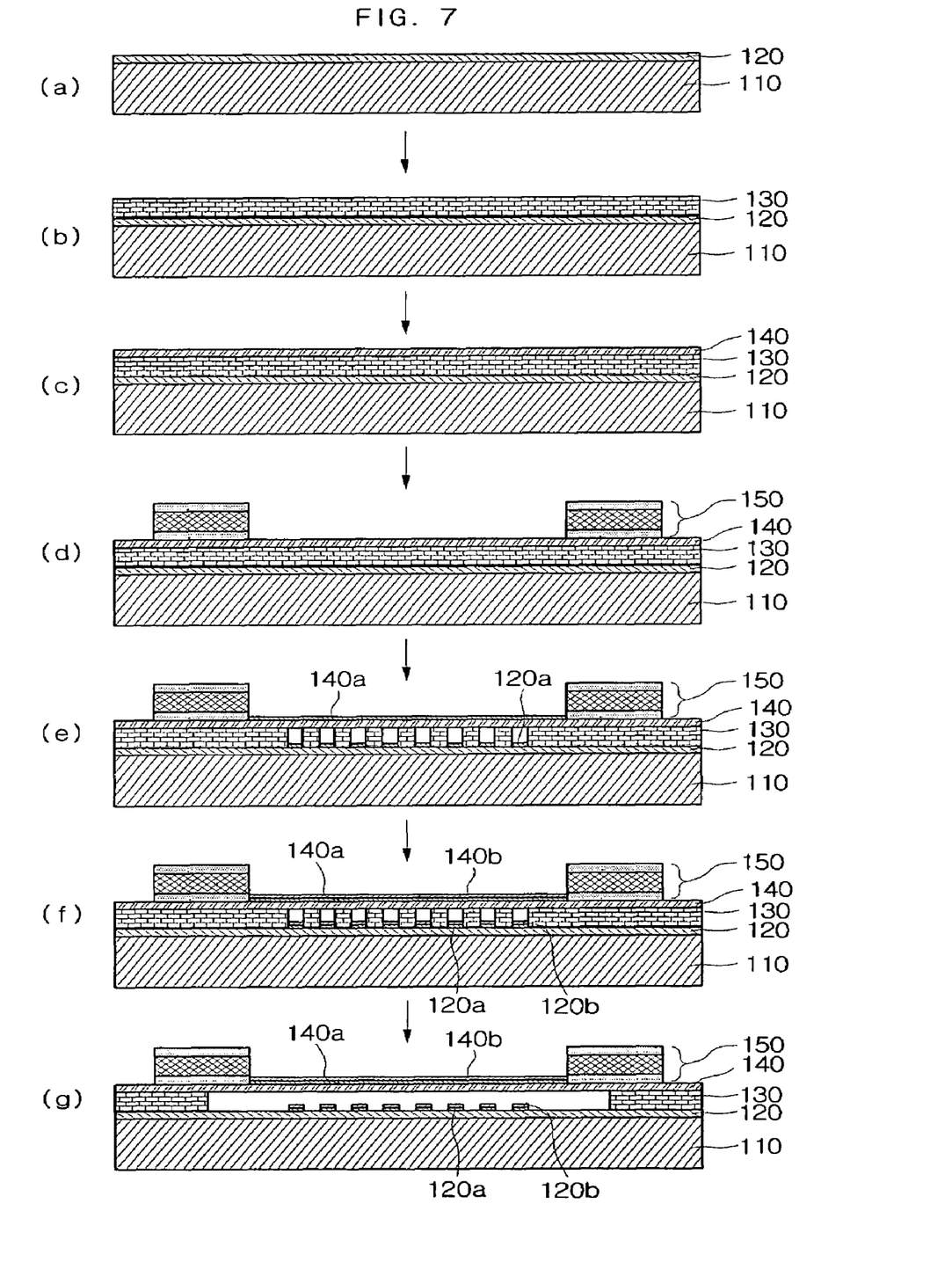

FIG. 7 is a diagram illustrating the manufacturing process for the optical modulator having a protective film on the reflective layer shown in FIG. 5.

Referring to (a) of FIG. 7, the insulation layer 120 is formed on the substrate 110. Here, the insulation layer 120 acts as an etch stop layer.

Referring to (b) of FIG. 7, the sacrificial layer 130 is formed on the insulation layer 120. In a subsequent process (see (g) of FIG. 7), the sacrificial layer 130 may provide the operating space for the ribbon part, and all or portions of the sacrificial layer 130 may be etched such that the ribbon part is spaced apart from the insulation layer 120 by a predetermined distance.

Referring to (c) of FIG. 7, the ribbon layer 140 is formed on the sacrificial layer 130. In a subsequent process (see (e) of FIG. 7), the ribbon layer 140 may be selectively etched to be given a particular shape (e.g. a shape having one or more holes).

Referring to (d) of FIG. 7, the piezoelectric elements 150 are formed on both ends of the ribbon layer 140. The piezoelectric element 150 is formed by stacking a lower electrode 151 on the ribbon layer 140, stacking a piezoelectric layer 152 on the lower electrode 151, stacking an upper electrode 153 on the piezoelectric layer 152, and then etching the portions of the upper electrode 153, piezoelectric layer 152, and lower electrode 151 except for the portions stacked on both of the ends of the ribbon layer 140.

However, in contrast to the case for the optical modulator illustrated in FIG. 7, it is possible to form the piezoelectric elements 150, not on the ends of the ribbon layer 140, but on the entire surface of the ribbon layer 140, in which case it is obvious that the etching may not be necessary.

Also, while it is not illustrated in FIG. 7, a $SiO_2$ layer of a particular thickness may further be included between the upper portion of the ribbon layer 140 and the lower portion of the lower electrode 151, to protect the upper portion of the underlying ribbon layer when the lower electrode 151 is etched.

Referring to (e) of FIG. 7, the upper reflective layer 140a is formed on the center portion, i.e. the ribbon part, of the ribbon layer 140, and the lower reflective layer 120a is formed on the insulation layer 120.

Here, a process of selectively etching the ribbon part and the sacrificial layer 130 under the ribbon part may precede the process of forming the upper and lower reflective layers 140a, 120a. For example, etching may be performed to form holes in the ribbon part, after which the process of etching the sacrificial layer 130 under the ribbon part may be performed through the holes formed in the ribbon part. In this case, it is possible to form the upper and lower reflective layers 140a, 120a by means of a single process, through the holes formed by the preceding process.

Of course, if the optical modulator is such that does not have holes, it may not be necessary to form the lower reflective layer 120a. If the lower reflective layer 120a is not formed, the lower-reflective-layer protective film 120b does not have to be formed either.

Referring to (f) of FIG. 7, the upper-reflective-layer protective film 140b and lower-reflective-layer protective film 120b are formed respectively on the upper and lower reflective layers 140a, 120a, for preventing the deterioration or oxidation of the surfaces of the upper and lower reflective layers 140a, 120a.

As described above, any one of alumina ($Al_2O_3$), silica ($SiO_2$), a silicon nitride material ($Si_xN_y$) such as $Si_3N_4$, etc., SiON, and SiOF may be used for the upper-reflective-layer protective film 140b and lower-reflective-layer protective film 120b. In addition, the upper-reflective-layer protective film 140b or the lower-reflective-layer protective film 120b may be composed of a plurality of layers, where it is obvious that any of the materials described above may be used as a material for each of the plurality of layers.

Here, it may be preferable that the thickness of the upper-reflective-layer protective film 140b or the or lower-reflective-layer protective film 120b be from $10^{-3}$ μm to 1 μm.

As described for operation (e) of FIG. 7, when there are holes formed in the ribbon part, the upper-reflective-layer protective film 140b and the lower-reflective-layer protective film 120b may also be formed by means of a single process.

While in the description of FIG. 7, the process of forming the upper-reflective-layer protective film 140b and lower-reflective-layer protective film 120b (see (f) of FIG. 7) and the process of forming the upper reflective layer 140a and lower reflective layer 120a (see (e) of FIG. 7) are described separately, the process of forming the upper-reflective-layer protective film 140b and lower-reflective-layer protective film 120b may be performed continuously in a vacuum in the same chamber used for the process of forming the upper reflective layer 140a and lower reflective layer 120a.

Referring to (g) of FIG. 7, after the upper-reflective-layer protective film 140b and lower-reflective-layer protective film 120b are formed, all or portions of the sacrificial layer 130 are etched by means of an etchant (where the etchant is an etchant gas or an etchant solution) to allow the ribbon part to be spaced apart by a predetermined distance from the insulation layer 120 and provide an operating space for the ribbon part.

Here, the etching of the sacrificial layer 130 may be formed by injecting the etchant through the holes formed in the ribbon part by operation (e) of FIG. 7.

As set forth above, aspects of the invention provide an optical modulator and a manufacturing method thereof, with which the deterioration and oxidation of the reflective layer surface due to heat or humidity can be avoided.

Also, other aspects of the invention can maximize the light diffraction property and reliability of the overall optical modulator, by improving the properties of the reflective layer by means of a protective layer.

While the present invention has been described with reference to particular embodiments, it is to be appreciated that various changes and modifications may be made by those skilled in the art without departing from the spirit and scope of the present invention, as defined by the appended claims and their equivalents.

What is claimed is:

1. An optical modulator comprising:
a substrate;
an insulation layer positioned on the substrate;
a ribbon layer positioned with an intermediate portion thereof spaced apart from the insulation layer by a predetermined distance;
a distal reflective layer positioned on the intermediate portion of the ribbon layer and configured to reflect or diffract incident light;
a distal-reflective-layer protective film positioned on the distal reflective layer and configured to protect the distal reflective layer; and
a piezoelectric element positioned on the ribbon layer and configured to move the central portion of the ribbon layer toward and away from the substrate.

2. The optical modulator of claim 1, further comprising:
a sacrificial layer positioned between the insulation layer and the ribbon layer and configured to support the ribbon layer; and
wherein a portion of the sacrificial layer located at an intermediate portion of the ribbon layer is removed, to be spaced apart from the insulation layer by a predetermined distance.

3. The optical modulator of claim 1, further comprising:
a proximal reflective layer positioned on the insulation layer and configured to reflect or diffract incident light; and
a proximal-reflective-layer protective film positioned on the proximal reflective layer and configured to protect the proximal reflective layer.

4. The optical modulator of claim 3, wherein a material of the proximal reflective layer is any one of Al2O3, SiO2, Si3N4, SiON, and SiOF.

5. The optical modulator of claim 4, wherein a thickness of the proximal reflective layer is selected from 10-3 μm to 1 μm.

6. The optical modulator of claim 3, wherein the proximal-reflective-layer protective film comprises a plurality of layers, and a material of at least one of the plurality of layers is any one of Al2O3, SiO2, Si3N4, SiON, and SiOF.

7. The optical modulator of claim 1, wherein a material of the distal reflective layer is any one of Al2O3, SiO2, Si3N4, SiON, and SiOF.

8. The optical modulator of claim 7, wherein a thickness of the distal reflective layer is selected from 10-3 μm to 1 μm.

9. The optical modulator of claim 1, wherein the distal-reflective-layer protective film comprises a plurality of layers, and a material of at least one of the plurality of layers is any one of Al2O3, SiO2, Si3N4, SiON, and SiOF.

* * * * *